(12) United States Patent
Bowen

(10) Patent No.: US 7,036,648 B2
(45) Date of Patent: May 2, 2006

(54) PRE-LOADED ROLLER TURN ROLLER

(75) Inventor: Brian D. Bowen, Independence, MO (US)

(73) Assignee: Automatic Systems, Inc., Kansas City, MO (US)

( * ) Notice: Subject to any disclaimer, the term of this patent is extended or adjusted under 35 U.S.C. 154(b) by 0 days.

(21) Appl. No.: 10/672,614

(22) Filed: Sep. 26, 2003

(65) Prior Publication Data

US 2005/0067252 A1  Mar. 31, 2005

(51) Int. Cl.
*B65G 13/00* (2006.01)

(52) U.S. Cl. ........................ 193/37; 193/35 R

(58) Field of Classification Search .............. 193/35 R, 193/37; 198/836.1, 837, 842
See application file for complete search history.

(56) References Cited

U.S. PATENT DOCUMENTS

| | | | | |
|---|---|---|---|---|
| 2,007,910 A | * | 7/1935 | Stephens | ..................... 198/813 |
| 3,255,858 A | * | 6/1966 | Reilly | ........................... 193/37 |
| 3,610,387 A | * | 10/1971 | Vom Stein | ................... 193/37 |
| 3,762,784 A | | 10/1973 | Pachuta | |
| 3,915,275 A | * | 10/1975 | Specht | ...................... 193/35 R |
| 3,971,601 A | | 7/1976 | Sytsma | |
| 4,113,328 A | | 9/1978 | Vander Meulen | |
| 4,154,447 A | | 5/1979 | Francis, Jr. et al. | |
| 4,265,133 A | | 5/1981 | Van Der Meulen et al. | |
| 4,309,063 A | | 1/1982 | Weis | |
| 4,344,218 A | * | 8/1982 | Hooper et al. | ................. 193/37 |
| 4,364,614 A | | 12/1982 | Weis et al. | |
| 4,408,808 A | | 10/1983 | Redmann, Jr. et al. | |
| RE34,924 E | * | 5/1995 | Highsmith | .................... 193/37 |
| 5,566,623 A | | 10/1996 | Wareham | |
| 6,076,647 A | * | 6/2000 | Agnoff | ......................... 193/37 |
| 6,547,054 B1 | * | 4/2003 | Gamache | ...................... 193/37 |

FOREIGN PATENT DOCUMENTS

DE  3625313  * 1/1988  ................... 193/37

OTHER PUBLICATIONS

"Roller Turn Rollers—Chain Rollers for All Types of Applications", Frost Incorporated (1 page).
"Tapered Bearing Rollers", Saginaw Products Corporation (1 page).
"Heavy-Duty Roller Turn Rollers & Bolts", Frost Incorporated (1 page).
"Roller Turn Rollers", Saginaw Products Corporation (1 page).

* cited by examiner

*Primary Examiner*—James R. Bidwell
(74) *Attorney, Agent, or Firm*—Chase Law Firm, L.C.

(57) ABSTRACT

A roller turn roller for an industrial conveyor comprises a continuous axle tube having opposed ends and a central axis of rotation, a pair of axially spaced, tapered roller bearings on the axle tube spaced inwardly from its ends, a roller shell supported by the bearings for rotation about the axis of the tube, and a pair of axially spaced retainers secured to the tube with the roller bearings disposed therebetween. Each of the retainers engages a corresponding bearing to pre-load the bearings to a desired clearance. A fastener extending across a pair of mounting bars on the conveyor, and through the axle tube mounts the roller turn roller between the bars.

6 Claims, 4 Drawing Sheets

PRE-LOADED ROLLER TURN ROLLER

This invention relates to roller turn rollers for industrial conveyors and similar applications.

BACKGROUND OF THE INVENTION

Roller turn rollers are utilized in overhead power and free, inverted power and free and monorail conveyor systems to control and guide the moving components of the conveyor around curves or turns and prevent lateral displacement of such components from the intended course. In a power and free conveyor, for example, a series of such rollers at the inside of a turn hold the power chain in proper vertical alignment with the free rail of the conveyor system to maintain interengagement with driven trolleys. As industrial conveyors are subjected to abrupt acceleration and deceleration in use and often carry heavy loads at significant speeds, the rollers utilized to stabilize the system in a turn are subjected to high impact forces and constant operation. This produces an environment unfriendly to a bearing. As a result, the stress on the rollers and lubricant starvation can cause bearing failure and result in the need to frequently replace a failed roller, resulting in down time and maintenance expense.

BRIEF DESCRIPTION OF THE INVENTION

In an embodiment of the present invention the aforementioned problem is addressed by providing a roller turn roller comprising a continuous axle tube having a pair of axially spaced, tapered roller bearings thereon supporting a roller shell for rotation about the axis of the tube. A pair of axially spaced retainers are secured to the axle tube with the roller bearings disposed therebetween, each retainer being an engagement with the corresponding bearing to pre-load the bearings to a desired internal clearance. A fastener, which may comprise a bolt, extends across a pair of mounting bars of the conveyor system and through the axle tube to mount the roller between the bars.

Other advantages of this invention will become apparent from the following description taken in connection with the accompanying drawings, wherein is set forth by way of illustration and example, an embodiment of the present invention.

DETAILED DESCRIPTION

Figure 1:
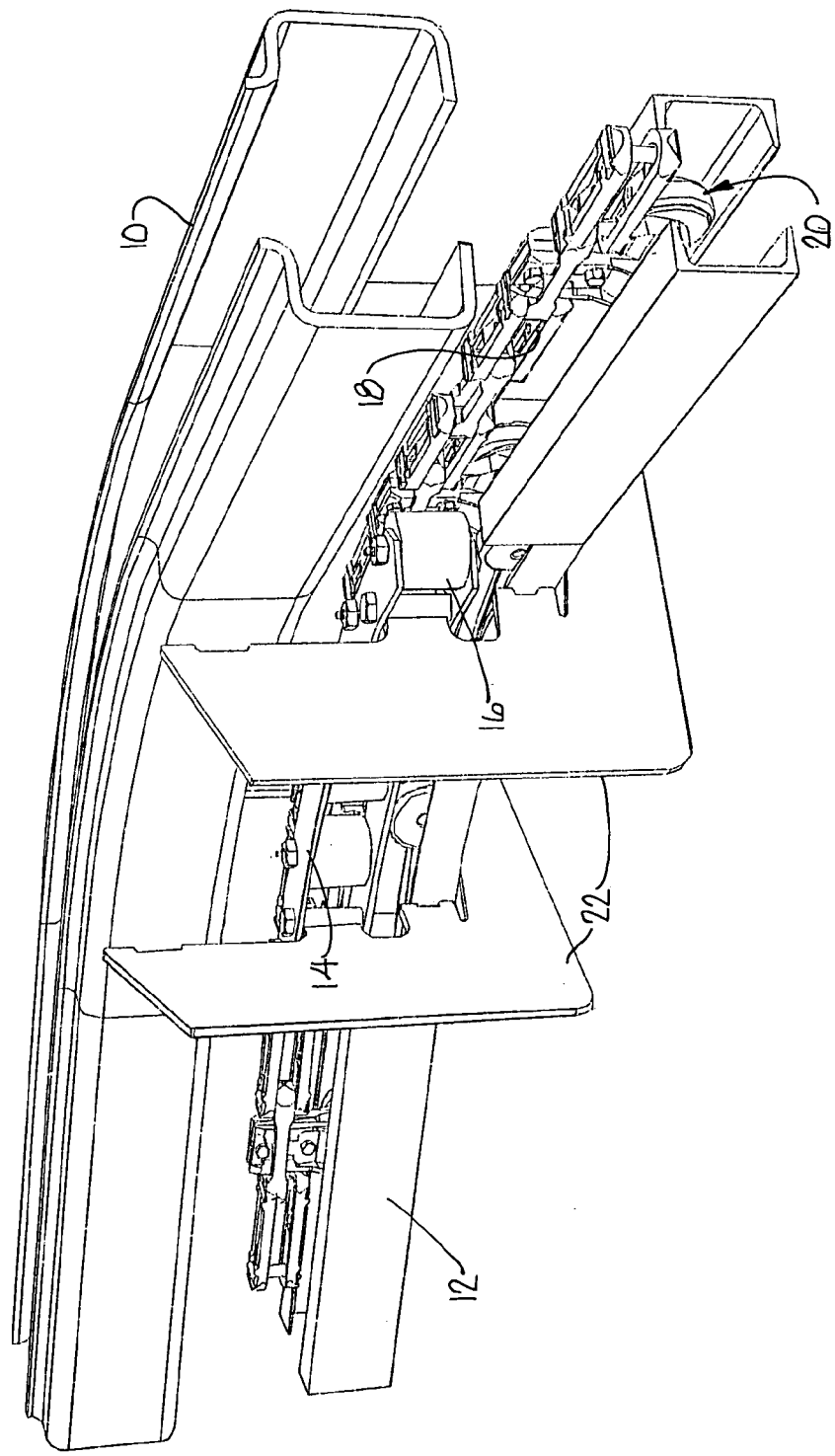
FIG. 1 is a partial, perspective view of an inverted power and free conveyor with the free trolleys and associated components removed for clarity, showing the segment bars and rollers at the inside of a turn.

Referring to the drawings, FIG. 1 illustrates a roller turn in an industrial conveyor, the particular conveyor system shown for illustrative purposes comprising an inverted power and free conveyor having a free rail 10 (conveyor components not shown for clarity), a power rail 12 vertically spaced beneath the free rail 10, a pair of curved, upper and lower segment bars 14 adjacent the power rail 12, a series of turn rollers 16 secured to the bars 14, and a power chain 18 carried by trolleys 20 that run in the power rail 12. As is typical, the power and free rails 12 and 10 are mounted and maintained in a fixed spaced relationship by yokes 22 spaced along the conveyor line. The segment bars 14 provide mounting bars for each of the roller turn rollers 16 at the inside of the turn.

Figures 2, 3:
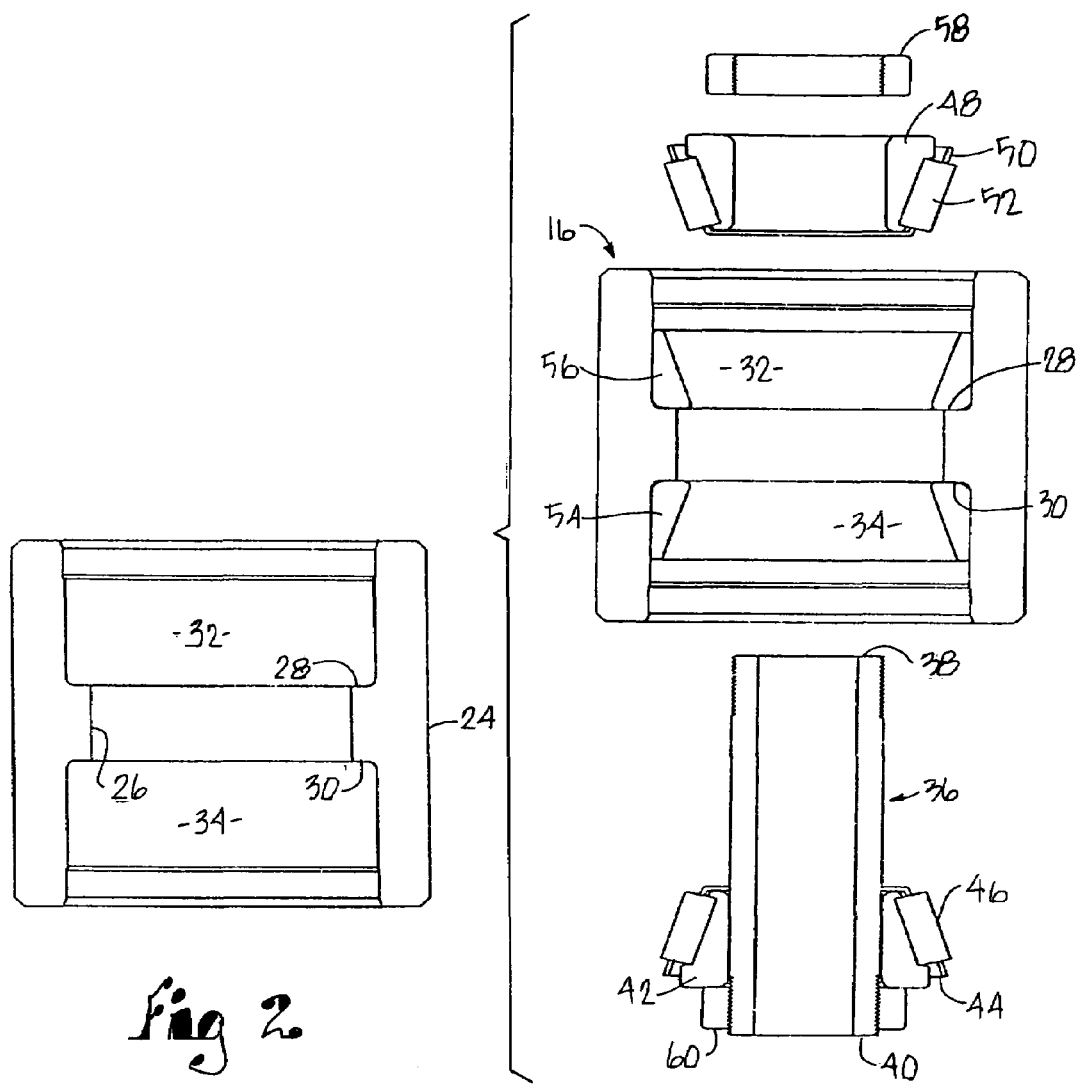
FIG. 2 is a view of the roller shell that presents the cylindrical bearing surface of the roller turn roller, showing the same in axial cross-section to reveal the internal configuration.
FIG. 3 is an axial exploded view of the roller turn roller, omitting the outer seals at each end.
Figure 5:
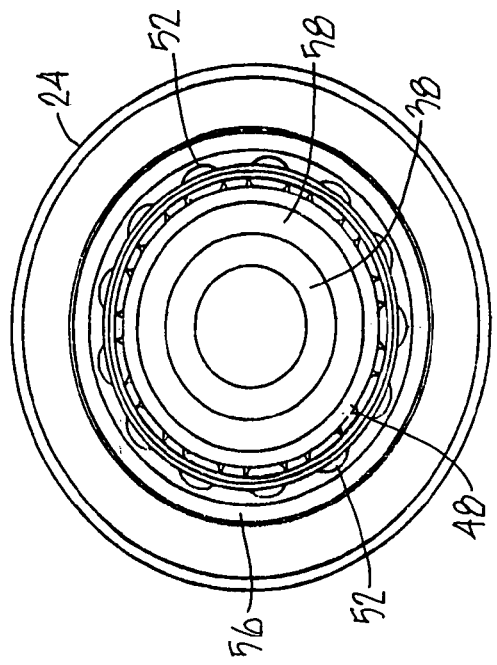
FIG. 5 is a plan view of the partially assembled roller turn roller of FIG. 4, the upper seal nut being removed to reveal the bearing rollers and cage of the upper roller bearing.
Figure 4:
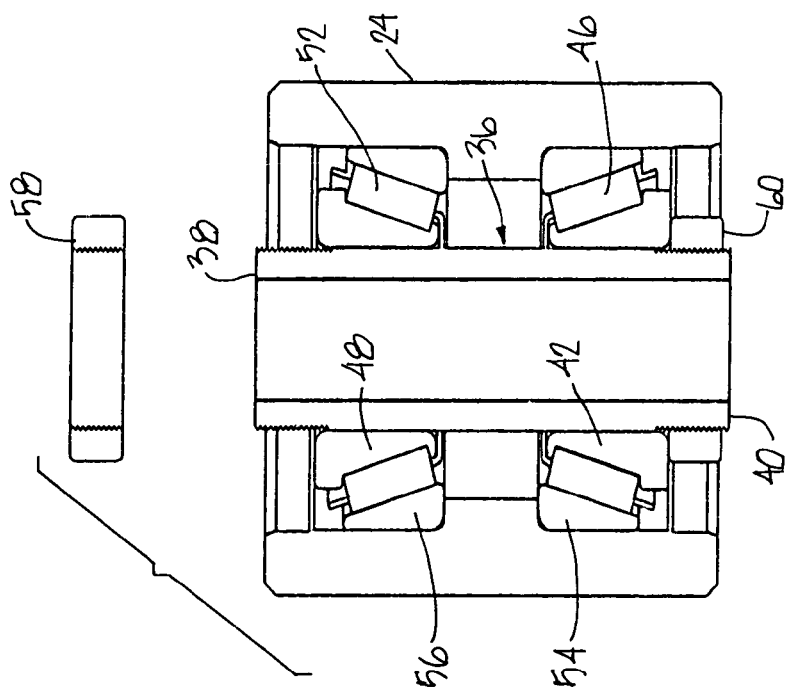
FIG. 4 is a cross-sectional, partially assembled view showing the tapered roller bearings in place within the roller shell, the lower seal nut in place, and the upper seal nut remaining to be installed.

FIGS. 2–7 show one of the rollers 16 in accordance with an embodiment of the present invention. A cylindrical roller shell 24 presents a cylindrical, upstanding bearing or contact surface that, in use, is engaged by the moving conveyor components (such as chain 18 in FIG. 1) at a roller turn. In FIG. 2 it may be seen that the cylindrical shell 24 has a central, internal, radially inwardly projecting shoulder 26 that presents upwardly and downwardly facing, annular surfaces or ledges 28 and 30 respectively. This defines a cylindrical upper cavity 32 and a cylindrical lower cavity 34 within the roller shell 24 for receiving other roller parts as will be described.

Figure 6:
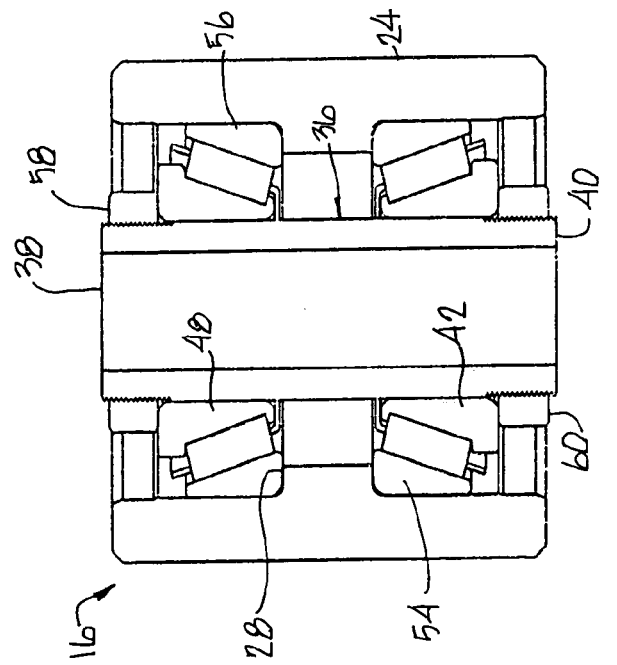
FIG. 6 is similar to FIG. 4 but shows the upper seal nut in place on the upper, threaded end of the axle tube.

Other components of the roller 16 are revealed in FIGS. 3–6. Assembly thereof may be appreciated by first viewing the exploded view of FIG. 3. A cylindrical axle tube 36, externally threaded at and adjacent to its top end 38 and its bottom end 40, is inserted into the roller shell 24 in coaxial alignment along with a lower bearing cone 42 and a bearing cage 44 and associated rollers 46. Similarly, an upper bearing cone 48, bearing cage 50 and rollers 52 are disposed in the upper portion of roller shell 24. Each of these bearing assemblies presents the inner race of a tapered roller bearing in each of the cavities 32 and 34. Prior to insertion, a bearing cup 54 presenting an outer race is seated in lower cavity 34 against ledge 30 and, in like manner, a bearing cup 56 is seated in upper cavity 32 against ledge 28. As shown in FIG. 6, when assembled within roller shell 24, upper and lower, tapered roller bearings are thereby provided.

As assembled in FIG. 6, it may be seen that the upper roller bearing (bearing cup 56 and bearing cone 48) is sandwiched between ledge 28 and an upper seal nut 58 threaded on the upper end 38 of axle tube 36. Similarly with respect to the lower roller bearing, a lower seal nut 60 on axle tube 36 bears against bearing cone 42 and, when tightened in place, leaves a portion of the lower end 40 of axle tube 36 projecting axially beneath the roller 16. Likewise, the upper seal nut 58 is threaded onto upper end 38 of tube 36 to a distance to permit end 38 to project axially clear of seal nut 58.

Before the sealing nuts 58 and 60 are screwed onto the ends 38 and 40 of tube 36, a permanent thread-locking compound is applied to the threads. Approximately 0.050 inch or more of thread protrudes outwardly from each nut as shown to present the exposed upper and lower ends 38 and 40. The nuts 58 and 60 serve as permanent retainers and are tightened against the tapered roller bearings to the desired pre-load; the compound is then allowed to cure, thereby permanently establishing operating internal bearing clearance. As the seal nuts 58 and 60 are permanently affixed in position, the bearing clearance and hence the pre-load is established for the life of the roller.

Figure 7:
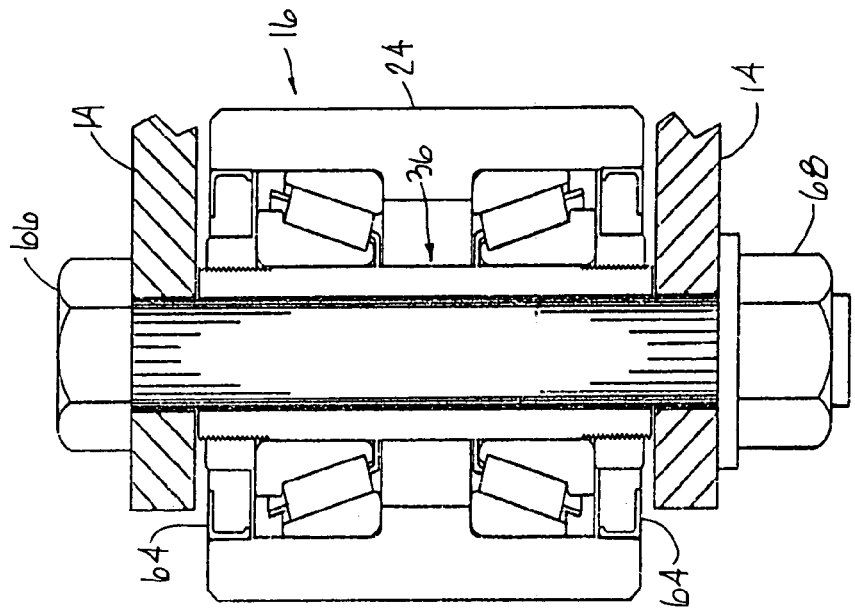
FIG. 7 is a fully assembled cross-sectional view of the roller turn roller with the upper and lower outer seals inserted therein, the roller being mounted between upper and lower segment bars.

Following the installation of the bearings, axle tube and seal nuts into the roller shell, the roller bearings are lubricated with grease and a pair of sealing rings 64 (FIG. 7) are installed at the upper and the lower ends of the roller around the nut 58 and the nut 60 (FIG. 7). The roller does not require re-lubrication for the duration of a normally anticipated service life.

In a representative application illustrated by the inverted power and free conveyor in FIG. 1, the roller 16 is installed between upper and lower segment bars 14 as shown in FIG. 7 by a bolt 66 that extends across the bars and is secured by a nut 68. It is important to note that the bolt extends coaxially through the axle tube 36. As may be appreciated from viewing FIG. 7, the ends 38 and 40 of the axle tube may engage the inner surfaces of the bars 14 depending upon the degree to which the nut 68 is tightened on the bolt 66. If this occurs, the axially projecting ends 38 and 40 of the axle tube 36 will abut the bars 14 and receive any axial force that the bars may apply to the roller assembly. As the ends 38 and 40 of the axle tube 36 project axially beyond the roller components, the axle tube 36 receives any force that the bars 14 may apply and thus isolates the internal bearing components from any additional loading.

It is to be understood that while certain forms of this invention have been illustrated and described, it is not limited thereto, except in so far as such limitations are included in the following claims and allowable equivalents thereof.

The invention claimed is:

1. In combination with a pair of spaced mounting bars, a roller turn roller comprising:
   a continuous axle tube having opposed, threaded ends and defining a central axis of rotation,
   a pair of axially spaced, tapered roller bearings on said axle tube spaced inwardly from respective ends thereof,
   a roller shell supported by said bearings for rotation about said axis,
   a pair of axially spaced, threaded retainers secured to said axle tube with said bearings disposed therebetween, each of said retainers engaging a corresponding bearing to pre-load the bearings to a desired clearance,
   a fastener extending across said mounting bars through said axle tube to mount the roller turn roller between the bars; and
   each of said ends of the axle tube project axially outwardly clear of the associated retainer.

2. The combination as claimed in claim 1, wherein the projecting ends of the axle tube are engageable with the mounting bars so that the tube receives any axial force that the bars may apply.

3. The combination as claimed in claim 1, wherein said roller shell has an internal, radially inwardly projecting shoulder between said roller bearings, and each of said roller bearings has an outer race component in engagement with said shoulder and an inner race component in engagement with the associated retainer, whereby the pre-load on each of the bearings is applied to the bearing races and the continuous axle tube.

4. The combination as claimed in claim 1, wherein said threaded ends and corresponding threaded retainers are in mating engagement, whereby the retainers are tightened on the axle tube to pre-load the bearings.

5. In combination with a pair of spaced mounting bars, a roller turn roller comprising:
   a continuous axle tube having opposed, threaded ends and defining a central axis of rotation,
   a pair of axially spaced, tapered roller bearings on said axle tube spaced inwardly from respective ends thereof,
   a roller shell supported by said bearings for rotation about said axis,
   a pair of axially spaced retainers threaded on respective ends of said axle tube with said bearings disposed therebetween, each of said retainers engaging a corresponding bearing to pre-load the bearings to a desired clearance,
   each of said ends of the axle tube projecting axially outwardly clear of the associated retainer, and
   a fastener extending across said mounting bars through said axle tube to mount the roller turn roller between the bars, whereby the projecting ends of the axle tube are engageable with the mounting bars so that the tube receives any axial force that the bars may apply.

6. In combination with a pair of spaced segment bars defining a turn in a power chain of an industrial conveyor, a roller turn roller comprising:
   a continuous axle tube having opposed, threaded ends and defining a central axis of rotation,
   a pair of axially spaced, tapered roller bearings on said axle tube spaced inwardly from the respective ends thereof,
   a roller shell supported by said bearings for rotation about said axis,
   a pair of axially spaced, threaded retainers secured to respective ends of said axle tube with said bearings disposed therebetween, each of said retainers engaging a corresponding bearing to pre-load the bearings to a desired clearance,
   each of said ends of the axle tube projecting axially outwardly clear of the associated retainer, and
   a fastener extending across the segment bars through said axle tube to mount the roller turn roller between the bars, whereby the projecting ends of the axle tube are engageable with the segment bars so that the tube receives any axial force that the bars may apply.

* * * * *